A. W. Conley,
Drain Tile.

No. 111,727. Patented Feb. 14, 1871.

WITNESSES.
Samuel H. Thomas
A. Thomas

INVENTOR.
Aaron W. Conley
By Joseph Ridge
His attorney.

United States Patent Office.

AARON W. CONLEY, OF ECONOMY, INDIANA.

Letters Patent No. 111,727, dated February 14, 1871; antedated February 2, 1871.

IMPROVEMENT IN DRAIN-TILES.

The Schedule referred to in these Letters Patent and making part of the same.

*To all whom it may concern:*

Be it known that I, AARON W. CONLEY, of Economy, Indiana, have invented a new and useful Drain-Tile, of which the following is a complete specification, reference being had to the accompanying drawing, in which—

Figure 1:
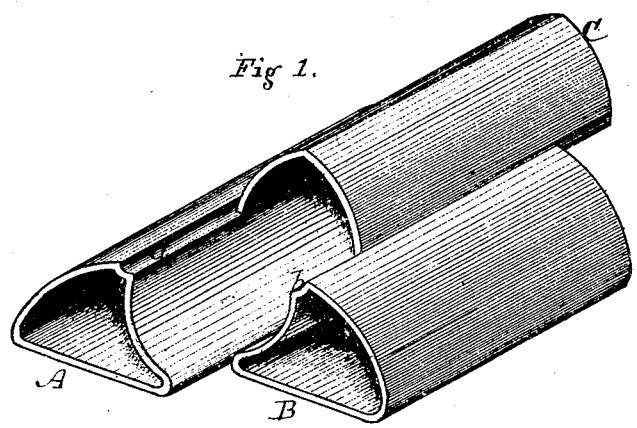

Figure 1 is a perspective view of a section of the drain, and

Figure 2:
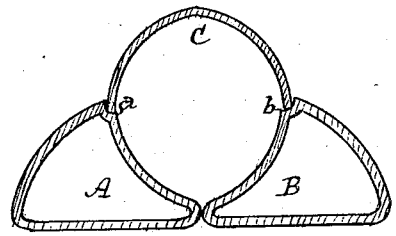

Figure 2, a cross-section.

My invention has for its object increased drainage capacity over that of drains as usually constructed of tile, while the machine with which it is made is the same as ordinarily used.

The series of sections forming the drain are composed of two complete tubes, A and B, and the segmental piece C. This combination forms three separate channels, thus giving a capacity equal to or greater than three times that of the single tube.

The adjacent surfaces of the tubes A and B are concave, thus with the segment C forming a circular central channel.

The edges of segment C rest in grooves $a$ and $b$ on the tubes A and B. The bottom surfaces of said tubes are flat, which, with the connection formed by the segment C resting in grooves $a$ and $b$, serves to prevent lateral displacement by pressure on top, thus securing the parts together.

In forming a drain the tubes and segment alternately overlap in joining the sections, as shown by their positions in fig. 1.

An easily-constructed modification of this plan of forming drains may be effected by composing the sections of three triangular tubes, the base of one of said tubes resting on the apexes of the other two. The base of the upper tube in this case is provided with grooves where it rests upon the lower tubes. Four channels are thus formed instead of three, as in the accompanying example.

Having thus fully described my said invention,

What I claim, and desire to secure by Letters Patent, is—

The tubes A and B, provided respectively with grooves $a$ and $b$, in combination with the arch C, substantially as and for the purpose set forth.

AARON W. CONLEY.

Witnesses:
JOSEPH RIDGE,
WM. E. BELL.